Jan. 17, 1933. K. NESSELMANN ET AL 1,894,359
ABSORPTION REFRIGERATING APPARATUS
Filed March 3, 1932 3 Sheets-Sheet 1

Inventors
Kurt Nesselmann &
Hans Bräuer
by Knight Bros
attorneys

Jan. 17, 1933.  K. NESSELMANN ET AL  1,894,359
ABSORPTION REFRIGERATING APPARATUS
Filed March 3, 1932   3 Sheets-Sheet 2
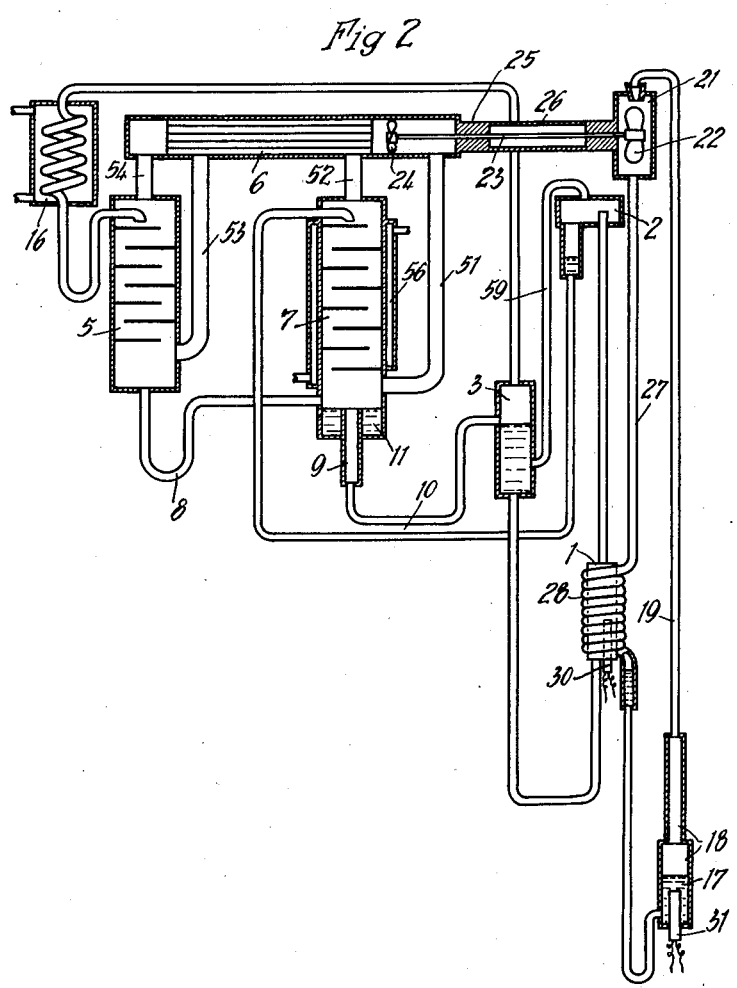

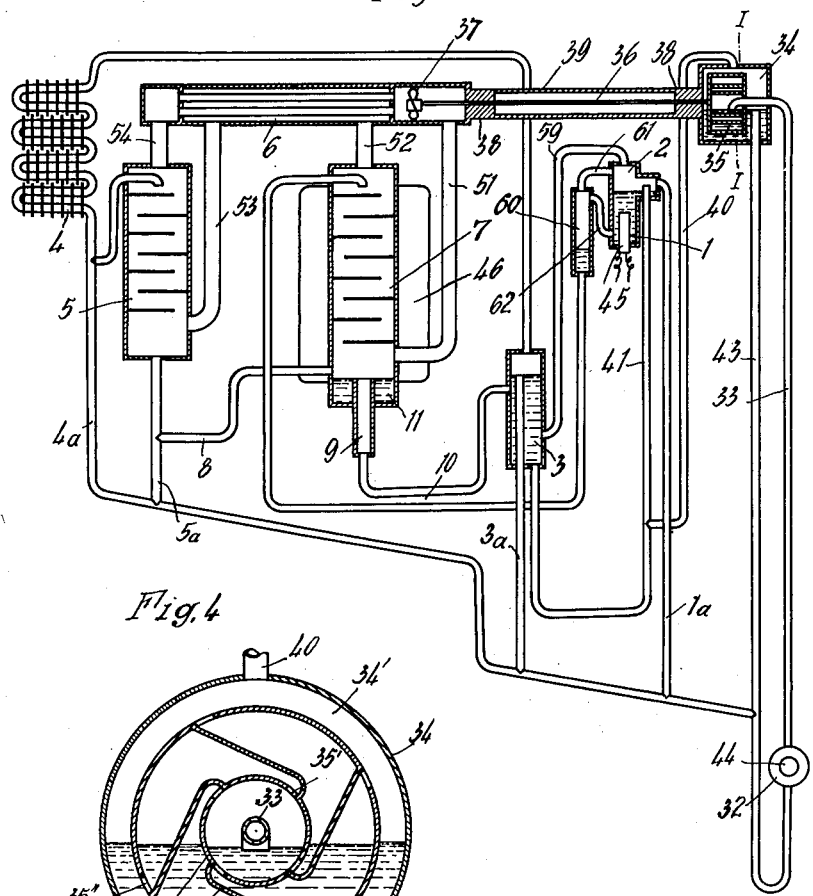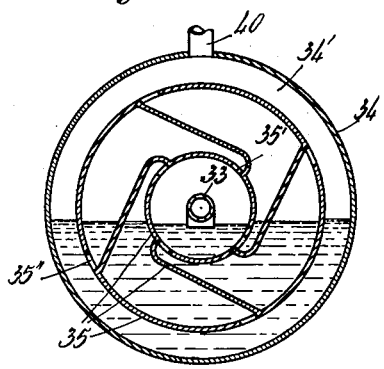

Patented Jan. 17, 1933

1,894,359

UNITED STATES PATENT OFFICE

KURT NESSELMANN AND HANS BRÄUER, OF BERLIN-SIEMENSSTADT, GERMANY, ASSIGNORS TO SIEMENS-SCHUCKERTWERKE AKTIENGESELLSCHAFT, OF BERLIN-SIEMENSSTADT, GERMANY, A CORPORATION OF GERMANY

ABSORPTION REFRIGERATING APPARATUS

Application filed March 3, 1932, Serial No. 596,515, and in Germany March 6, 1931.

Our invention relates to absorption refrigerating apparatus, and more particularly to a device for the production of a circulation of gas within an absorption refrigerating apparatus of the continuous type.

It has already been proposed to mix an inert gas with the vapor of a refrigerating medium in the evaporator and absorber of absorption refrigerating apparatus and to circulate the gas mixture through the evaporator and absorber or only through the absorber. It has hitherto been customary in a device of the above character to introduce a portion of the vapor of the refrigerating agent developed in the absorption apparatus directly into one of the vessels containing the inert gas. This has, however, the disadvantage that the quantity of vapor of the refrigerating agent utilized to cause a circulation of the gas mixture will not reach the condenser, but will be absorbed in the absorber, so that the said quantity of vapor is lost to the useful output of the absorption apparatus. Furthermore, it is difficult to control the amount of vapor of the refrigerating agent flowing in the circulating system of the gas mixture independently of the intensity of flow of the liquid circulating through the generator and the absorber and to adapt it to the fluctuating operating conditions of the apparatus, since in the heretofore known device the vapor of the refrigerating agent, utilized to cause a circulation of the gas mixture has been, as a rule, produced in the same generator in which also the vapor bubbles have been developed in order to cause the liquid to circulate between the generator and absorber.

Our invention has for its object to overcome the foregoing disadvantages, by providing a device in which the vapor of an agent is utilized to directly or indirectly cause the gas or gas mixture to circulate, the agent used for this purpose being different from the media coacting in the absorption refrigerating apparatus. The vapor necessary for causing a gas circulation is preferably developed in a vapor generating vessel lying exteriorly of the circulating system for the absorption solution, and is condensed in the absorber or on its way to the same, after it has caused the gas to circulate, whereas the condensate is again supplied to the vapor generator. The aforesaid vapor may be directly supplied to the gas circulating system by means of a nozzle. The pressure required for causing this vapor to pass through the nozzle may be produced and maintained, for instance, by a column of liquid, consisting of the liquefied vapor. It is, however, also possible to utilize the operating vapor developed in the vapor generating vessel to operate an impeller or another device, rotatably mounted within the walls of the refrigerating apparatus for driving a ventilator disposed within the gas space of the absorption apparatus. The heat developed during the condensation of operating vapor may be supplied to a part of the absorption apparatus capable of taking up heat; for instance to the generator, wherein the heat is utilized. In case the agent from which the operating vapor is generated has a specific gravity in the liquid state other than the liquids operating in the absorption apparatus, the media may be brought together within the absorption apparatus during the condensation of of the operating vapor and separated again from one another by the action, due to the difference in specific gravity. If the operating vapor is used to operate a nozzle disposed in the gas circulating system, it is of advantage to develop the vapor from a liquid which has a heavier molecular weight than the liquids operating in the absorption apparatus, for which purpose mercury is the most suitable substance.

The invention will now be more particularly described with reference to the accompanying drawings, which illustrate several embodiments of the invention.

In the drawings:

Figure 2 shows a second embodiment of the invention in which a ventilator driven by an impeller is used for circulating the gas.

Figure 3 shows a third embodiment where-

Figure 4 is an enlarged sectional view taken on the line I—I of the driving means of the third embodiment.

Figure 1:
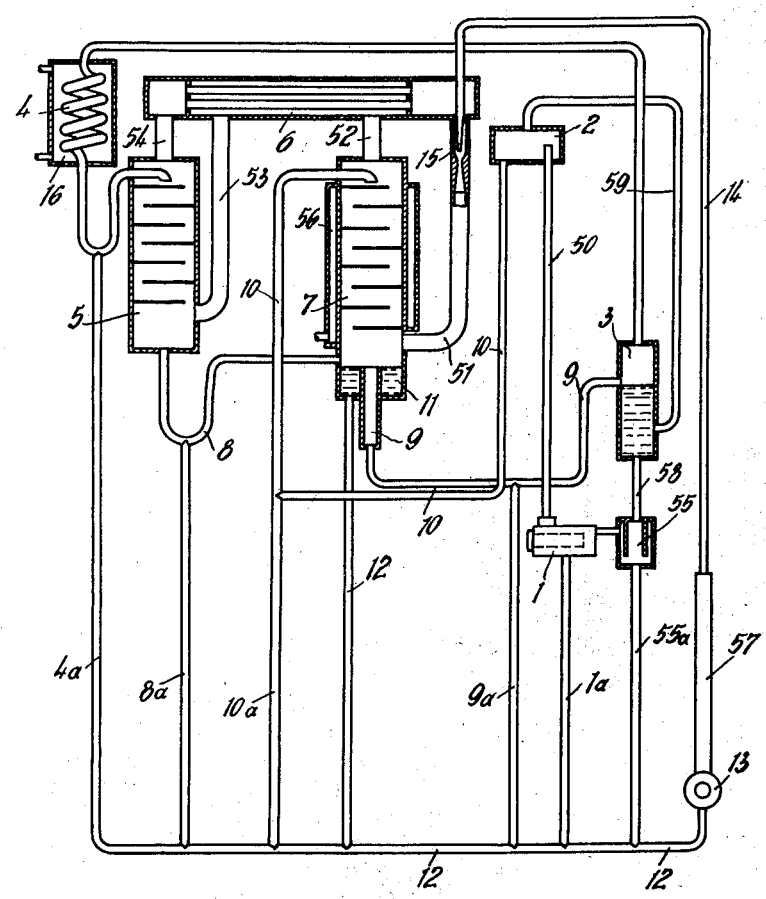
Figure 1 shows one embodiment of the invention in which a nozzle is employed through which a vapor other than the vapor of the refrigerant is introduced into the gas circulating system.

Referring to Fig. 1, 1 denotes the electrically heated generator of an absorption refrigerating apparatus of the continuous type, in the evaporator and absorber of which an inert gas is mixed with the refrigerating medium. The operation thereof is effected in the following well-known manner.

The vapor bubbles developed from the absorption solution raise the weak solution in a rising conduit 50 into a gas separator 2, where the vapor and liquid are separated from each other; thence the vapor of the refrigerating medium passes through a conduit 59, and a rectifier 3, which it enters at a point below the level of the liquid contained therein, into the condenser 4 designed in form of a coil, surrounded by a cooling jacket 16 in which water circulates. The condensate then enters the upper part of the evaporator 5, evaporates therein on flowing down over a series of baffling members and mingles with the ascending inert gas. As absorption fluid, ammonia solution dissolved in water and as inert gas nitrogen may be employed. The weak solution flows from the gas separator 2 through a U-shaped conduit 10 into the absorber 7 which is provided with a cooling jacket 56. In the absorber 7, the ammonia vapor is absorbed from the gas mixture rising in counter-flow to the solution descending within the absorber 7, and the inert gas passes through a conduit 52 into a gas heat exchanger 6 arranged between the absorber 7 and the evaporator 5, and leaves the exchanger 6 again through a conduit 53 leading to the evaporator 5. A heat exchange of the gas flowing from the absorber 7 to the evaporator 5 thus takes place with the gas mixture which flows from the evaporator 5 through the conduit 54, the heat exchanger 6, the conduit 51 and back to the absorber 7. The liquid not evaporated in the evaporator 5 is supplied through a U-shaped drain pipe 8 to the body of liquid 11 contained in the lower part of the absorber. Whence this liquid passes together with the absorption solution enriched in gas through a conduit 9 designed as an overflow, which forms with the liquid conduit 10 a heat exchanger, into the rectifier 3 and back to the generator 1 by way of a conduit 58 through an intermediate vessel 55 which is intended to prevent the passage of the gas bubbles from generator 1 into rectifier 3, in the event of the rising conduit being temporarily obstructed.

In order to bring about the circulation of the gas mixture, a nozzle 15 is employed which is disposed within the conduit 51 which connects the gas heat exchanger 6 to the absorber 7. The vapor required for the operation of the nozzle 15 is generated from liquid mercury in an electrically heated vapor generating vessel 13, and is supplied after leaving the vapor dome 57 of the boiler 13 through a conduit 14 to the nozzle 15. As the mercury vapor has a great molecular weight, its kinetic energy is relatively high, so that small amounts will suffice to accelerate the gas mixture to be circulated. On the other hand, as the boiling point of the mercury is high, the mercury vapor will rapidly condense at those temperatures prevailing in the conduit 51 or in the absorber 7. The liquefied mercury collects at the bottom of the body of liquid 11, in the lower part of the absorber 7, and thence passes through the conduit 12 back to the vapor generating vessel 13. It may happen that small amounts of mercury are entrained into other parts of the absorption apparatus. This is particularly the case, if the completely filled absorption apparatus assumes different positions during the transport. In order to ensure also the supply of these quantities of mercury to the vapor generating vessel 13, the parts of the absorption apparatus in question, viz., the condenser 4, the drain pipe 8, the U-shaped conduits 9 and 10, the generator 1 and the intermediate vessel 55 are connected with the lowest portion of the conduit 12 through the return conduits 4a, 8a, 10a, 9a, 1a and 55a.

In the embodiment shown in Fig. 2, in which the same reference numerals denote the same parts, the absorption apparatus is exactly of the same type as that disclosed in Fig. 1. This modification differs from the one shown in Fig. 1 in that a ventilator mounted within the gas space of the absorption apparatus is employed to bring about the circulation of the gas mixture. As the operation of the absorption apparatus is substantially the same as of the embodiment of Fig. 1, only such parts as are closely connected with the circulation of the gas mixture between the evaporator and absorber shall be hereinafter described.

The vapor which is utilized for driving the gas circulation device is developed from the liquid toluene in a vapor generating vessel 17 provided with a vapor dome. Toluene is a substance of great molecular weight and of relatively high-boiling point, and is therefore particularly suitable for the desired purpose. The toluene vapor passes through a conduit 19 into the casing 21, rigidly connected to the gas circulating system of the absorption apparatus. Within this casing, an impeller (turbine) is mounted on a shaft 23. The shaft 23 provided at both ends with stuffing boxes 25 and carrying a ventilator 24 on the end projecting into the gas space of the absorption apparatus, runs through a pipe 26 connecting the casing 21 with the gas heat exchanger 6. The ventilator 24 produces a circulation of the gas mixture from the heat exchanger 6 through the conduit 51, the absorber 7, through the conduits 52 and 53, the heat exchanger 6 lying therebetween, through evaporator 5, conduit 54 and back to the heat exchanger 6. The operating vapor after having imparted its kinetic energy to the impeller 22 is supplied through the conduit 27 to the condenser 28 designed in form of a coil and the condensate flows from the lower part of the condenser 28 through the U-shaped conduit back into the vapor generating vessel 17. The condenser 28 is wrapped around the generator 1 of the absorption apparatus. As the temperature at which the toluene vapor condenses at a pressure below atmospheric is higher than the mean temperature of the ammonia fluid in the generator from which liquid ammonia vapor is developed, the heat of generation may be produced by the heat of condensation of the toluene. In case this amount of heat should not, however, be sufficient, an additional amount of heat must still be imparted to the generator 1. To this end, a cartridge heating element 30 is provided.

The embodiment shown in Fig. 3 is substantially the same as the modification illustrated in Fig. 2, except that the condenser 4 and the absorber 7 are not cooled by cooling liquid but by air, and are accordingly provided with cooling ribs, and that the ventilator driving means is of a gas-meter type. The absorption apparatus is also in this case operated with ammonia liquid as absorption solution and with nitrogen as inert gas. The circulation of the gas is brought about by a ventilator 37 which is operated as in the last-described embodiment by toluene vapor, generated in a vapor boiler 32, heated by an electric cartridge heating element 44, and rises through the conduit 33 into the drum 35 of a ventilator driving means of the gas-meter type below the level of the liquid contained therein, as will be seen from Fig. 4. The drum 35 is mounted on one end of a rotating shaft 36 journaled in the stuffing boxes 38, the end of the shaft projecting into the gas space of the absorption apparatus being provided with the ventilator 37. The stuffing boxes 38 disposed within the connecting pipe 39 serve to seal the said gas space. The drum 35 is enclosed in a casing 34, the lower part of which is also filled with liquid, and which is rigidly connected to the pipe 39. The rotation of the drum 35 is caused by the slight difference in pressure prevailing between the gas space of the movable part 35 and that of the stationary part 34 similar as in the case of a gas-meter. Upon rotation of the drum 35 the toluene vapor escapes through the ports 35' and 35" into the annular space 34' above the liquid, and thence through a descending conduit 40 into a conduit 41 where it is utilized to lift the absorption solution coming from the rectifier 3 into the gas separating space of the generator 1.

An overflow pipe 43 conveys the excessive amount of liquid contained in the casing 34 back to the vapor generating vessel 32. In the gas separating space 2, the toluene vapor is separated from the ammonia liquid, which it has lifted; whereupon it passes through the conduit 59 into the rectifier 3, and it is here condensed in the ammonia solution; the condensate floats on surface of the absorption liquid contained in the rectifier 3; thence it passes through the overflow pipe 3a, the lower portion of the U-shaped conduit 43 back into the vapor generating vessel 32. The ammonia vapor generated in the generator 1 from the absorption solution heated by the cartridge heating element 45 flows likewise mingled with the toluene vapor into the rectifier 3 through the conduit 59, and thence it is conveyed to the condenser 4 in a dry state. The weak absorption solution passes through an upwardly extending conduit 62 into a collecting vessel 60, which is connected at the upper part to the gas separating space 2 by means of a pressure relief conduit 61, whence it passes through a conduit 10 into the absorber 7. The point at which the tube 62 enters the collecting vessel 60 lies so high that the heating surface of the generator 1 is always in contact with the liquid.

As the liquid toluene is lighter than the aqueous ammonia solution in the rectifier 3, it floats in this vessel on the surface of the solution, and may be consequently carried off by the conduit 3a. In case the liquid toluene should also collect in the generator 1, it will also float on the surface of the absorption solution and can return to the vapor generator vessel 32 through a conduit 1a, whereas the toluene vapor entrained into the condenser 4 or into the evaporator 5 is condensed therein. Also these vessels are connected to the vapor generating vessel 32 through the conduit 4a and 5a. As the liquid toluene is heavier than the liquid ammonia it flows, therefore, by reason of the greater gravitational force into the conduits 4a or 5a and from here back into the vapor generating vessel 32.

It is not absolutely necessary to employ toluene vapor for the operation of the device designed in the form of a gas-meter; the operating vapor might as well be developed for the above purpose from any other suitable medium; for instance, from an unsaturated or saturated carburetted-hydrogen or from a cyclic compound of carbon and hydrogen. It is only essential that the agent from which the operating vapor is developed has no tendency to mix with the liquids operating in the absorption apparatus. The tendency to mix said media is the lesser, the more the specific gravity of the agent from which the operating vapor is developed in the liquid state differs from the weight of the liquids operating in the absorption apparatus.

In the last-described embodiment, the operating vapor is not only utilized to actuate the device which drives the ventilator 37, i. e., besides causing the circulation of the gas mixture it brings about at the same time in the conduit 41 the circulation of liquid between the expeller 1 and the absorber 7, thus greatly simplifying the absorption apparatus.

Although in the above described embodiments an inert gas is mixed with the vapor of the refrigerating agent of the absorption apparatus, the circulation of which gas is effected through the evaporator and generator by means of the above described driving means, the invention may also be used for such absorption apparatus as are operated without an inert gas. The circulation in this case serves exclusively to intimately mix the vapor of the refrigerating medium with the absorption agent so as to improve the absorption effect and to facilitate the evaporation and the production of cold. The invention is also not limited to absorption refrigerating apparatus of the continuous type. The invention may also be advantageously used to improve the operating conditions in absorption apparatus operating periodically, particularly in such cases in which an inert gas need not necessarily be employed.

We claim as our invention:

1. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus.

2. The method of moving an inert gas to be circulated through the evaporator and absorber of continuous-operation absorption refrigerating apparatus which comprises generating the vapor from an agent different from the agents utilized for the operation of the absorption apparatus, employing said vapor to cause said gas circulation, condensing said vapor after it has caused the gas circulation and returning the condensate to the point where the vapor is generated.

3. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a nozzle in said gas circulating system for causing said gas circulation by means of a vapor passing through said nozzle, a vessel exteriorly of said liquid circulating system and capable of being heated for generating said vapor from an agent different from the agents coacting in the absorption apparatus and a vapor conduit connecting said vessel with said nozzle.

4. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a nozzle in said gas circulating system for causing said gas circulation by means of a vapor passing through said nozzle, a vessel exteriorly of said liquid circulating system and capable of being heated for generating said vapor from an agent different from the agents coacting in the absorption apparatus and a vapor conduit connecting said vessel with said nozzle, a liquid conduit connecting the bottom of said absorber with said vapor generating vessel and forming a liquid seal, means for condensing said vapor after passing through said nozzle and a conduit for carrying off the condensate of said vapor to said liquid seal for the formation of a liquid column supported by the pressure produced in said vessel.

5. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent said agent being different from the agents coacting in the absorption apparatus, the agent contained in said vapor generating vessel having in a liquid state a specific gravity different from that of the liquids operating in the absorption apparatus.

6. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, the agent contained in said vapor generating vessel having in a gaseous state a greater molecular weight than the fluids operating in the absorption apparatus.

7. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system, and capable of being heated for generating said vapor agent, said agent being different from the agents coacting in the absorption apparatus, the agent contained in said vapor generating vessel having in a liquid state a specific gravity different from that of the liquids operating in the absorption apparatus, said agent consisting of mercury.

8. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, the agent contained in said vapor generating vessel having in a gaseous state a greater molecular weight than the fluids operating in the absorption apparatus, said agent consisting of mercury.

9. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, all liquid carrying vessels of the absorption apparatus being connected to said vapor generating vessel through return conduits for the liquefied operating vapor agent.

10. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, a ventilator disposed within the gas space of the gas circulating system for circulating the gas in said system, an impeller, rotatably mounted within the casing of said impeller and operated by said vapor agent to drive said ventilator.

11. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, a ventilator disposed within the gas space of the gas circulating system for circulating the gas in said system, an impeller, rotatably mounted within the casing of said impeller and operated by said vapor agent to drive said ventilator, said vapor agent consisting of a medium of relatively high boiling-point.

12. In combination with an absorption refrigerating apparatus of the continuous type, comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, a ventilator disposed with the gas space of the gas circulating system for circulating the gas in said system, an impeller, rotatably mounted with the casing of said impeller and operated by said vapor agent to drive said ventilator, said vapor agent consisting of toluene.

13. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, a ventilator disposed within the gas space of the gas circulating system for circulating the gas in said system, an impeller, rotatably mounted within the casing of said impeller and operated by said vapor agent to drive said ventilator, a condensation vessel in a conduit connecting the casing of said impeller to said vapor generating vessel, said condensation vessel being so disposed as to effect a heat exchange with the generator of the absorption apparatus.

14. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, a ventilator disposed within the gas space of the gas circulating system for circulating the gas in said system, a gas-meter like motor, rotatably mounted within the casing of said motor and operated by said vapor agent to drive said ventilator.

15. In combination with an absorption refrigerating apparatus of the continuous type comprising a generator, a condenser, an evaporator and an absorber, an absorption solution circulating system containing said generator and absorber, an inert gas circulating system comprising said evaporator and absorber, a driving means for the circulation of said inert gas, a vapor agent for operating said driving means and a vessel exteriorly of said absorption solution circulating system and capable of being heated for generating said vapor agent, said agent being different from the agents coacting in the absorption apparatus, a ventilator disposed within the gas space of the gas circulating system for circulating the gas in said system, a gas-meter like motor, rotatably mounted within the casing of said motor and operated by said vapor agent to drive said ventilator, the conduit leading from said absorber to said generator in the liquid circulating system having a portion thereof rising into the gas space of said generator, said motor casing being connected to said rising conduit portion at a point lying so below said generator as to cause the vapor agent to raise the liquid within said conduit into said gas space.

In testimony whereof we affix our signatures.

KURT NESSELMANN.
HANS BRÄUER.